United States Patent [19]
Connors et al.

[11] Patent Number: 5,091,809
[45] Date of Patent: Feb. 25, 1992

[54] DISC DRIVE WITH SMALL AIR GAP BETWEEN BACK IRON AND SPINDLE HUB

[75] Inventors: Eugene E. Connors, Edina; Susan A. W. Holm, Minneapolis, both of Minn.

[73] Assignee: Seagate Technology, Inc., Scotts Valley, Calif.

[21] Appl. No.: 560,425

[22] Filed: Jul. 31, 1990

[51] Int. Cl.$^5$ ............................................. G11B 17/02
[52] U.S. Cl. ............................... 360/99.08; 360/98.01; 360/97.02; 360/97.03
[58] Field of Search ............... 360/99.08, 98.01, 97.02, 360/97.03, 97.04, 133, 135

[56] References Cited

U.S. PATENT DOCUMENTS

| | | | |
|---|---|---|---|
| 4,535,373 | 8/1985 | Schuh | 360/97.02 |
| 4,713,704 | 12/1987 | Voll et al. | 360/99.08 |
| 4,717,977 | 1/1988 | Brown | 360/98.01 |
| 4,779,165 | 10/1988 | Elasaesser et al. | 360/97.02 |
| 4,818,907 | 4/1989 | Shirotori | 360/97.02 |
| 4,843,500 | 6/1989 | Elsässer et al. | 360/97.02 |
| 4,922,406 | 5/1990 | Schuh | 360/97.03 |
| 4,928,029 | 5/1990 | Wright | 360/99.08 |

Primary Examiner—Aristotelis Psitos
Assistant Examiner—Alfonso Garcia
Attorney, Agent, or Firm—Flehr, Hohbach, Test, Albritton & Herbert

[57] ABSTRACT

An apparatus for attaching the rotor to the spindle hub and minimizing the effects of the difference of thermal expansion of the rotor and the spindle hub upon the discs during thermal cycling. To facilitate minimizing the thermal effects, the rotor outer diameter is smaller than the inner diameter of the spindle hub such that an air gap is maintained between the two parts. One end of the cylindrical back iron portion of the rotor is attached to a radially extending wall portion closing one of the two axial ends of the cylindrical portion of the spindle hub. In other words, the rotor is end-mounted inside the spindle hub. The attachment is accomplished by using screws which extend through the radial extending portion of the spindle hub into one end of the cylindrical back iron portion of the rotor or, in the alternative, by epoxying the two elements together.

20 Claims, 2 Drawing Sheets

DISC DRIVE WITH SMALL AIR GAP BETWEEN BACK IRON AND SPINDLE HUB

The present invention relates generally to disc drives and particularly to an improved spindle hub having an end mounted rotor.

BACKGROUND OF THE INVENTION

The present invention is an improvement upon the means by which the rotor back iron, also known as the magnetic shield, of an outer rotor type motor is attached to the spindle hub in a disc drive. Generally, an outer rotor type disc drive motor consists of a stator which contains all of the active magnetic circuits used to drive the motor and a cylindrical rotor containing a number of permanent magnets that interact with the active magnetics causing rotor rotation about the stator. Additionally, the rotor contains a substantially cylindrical back iron to which the permanent magnets are attached. In some "in-hub" motor designs, the back iron is cup shaped.

A spindle hub to which one or more discs are attached is connected to the rotor such that the discs are made to rotate. In state of the art rotary shaft motors, the spindle hub is cup shaped having the bottom of the cup providing a surface to which a shaft is mounted. The shaft extends axially internally to the cup-shaped spindle hub. The shaft, working in cooperation with a pair of bearings, provides the axis about which the discs will rotate. The cylindrical-wall of the cup shaped spindle hub is machined to fit snuggly over the outer diameter of the back iron. The two parts are attached by press fitting one part into the other or applying epoxy to the cylindrical surface of the parts. Thus, as the rotor move about the stator the discs would rotate.

Another method of attaching the rotor to the spindle hub has been disclosed by Harold T. Wright in U.S. Pat. No. 4,754,351. Wright teaches a method in which teflon strips are placed between the outer diameter of the rotor and the inner diameter of the spindle hub. The teflon is attached to the rotor and then the rotor-teflon combination is forced into the spindle hub. The strips absorb the thermal expansion differences between the rotor and spindle hub.

In a state of the art fixed shaft motor, a cup shaped spindle hub is attached to a stationary shaft via a bearing system. In this arrangement, the spindle hub rotates about the stator and shaft. The rotor back iron is attached to the cup shaped spindle hub in the same manner as it is in the rotary shaft motor described above.

A serious problem arises when using the press fit or surface epoxy methods of spindle hub to back iron attachment. The coefficient of thermal expansion of the back iron, usually made of steel, and the spindle hub, usually made of aluminum, differ significantly. Consequently, as the ambient temperature of the motor varies from use and shipping, the expansion of the back iron distorts the cylindrical surface to which the discs are mounted on the spindle hub. The distortion allows the discs to move or slip displacing tracks so they are unreadable and possibly making the disc drive non-operational.

The Wright method of Pat. No. 4,754,351 has a significant drawback, in that the manufacturing costs to install the teflon spacer arrangement are significant.

An object of the present invention is to provide a means for attaching the rotor to the spindle hub which minimizes the effects of thermal cycling on the discs without incurring excessive manufacturing costs.

SUMMARY OF THE INVENTION

In summary, the present invention is an apparatus for attaching the rotor to the spindle hub which minimizes the effects of thermal cycling on the discs. To facilitate minimizing the thermal effects, the inner diameter of the cylindrical portion of the cup shaped spindle hub is counter-bored larger than the rotor outer diameter such that an air gap is maintained between the two parts. The end of the cylindrical back iron portion of the rotor is attached to a radially extending wall portion closing one of the two axial ends of the cylindrical portion of the cup shaped spindle hub. The attachment is accomplished by using screws which extend through the radial extending portion of the cup shaped spindle hub into the back iron portion of the rotor mounting it on three points or by epoxying the two elements together. The air gap provides space for the back iron to expand without distorting the spindle hub surface, while maintaining the interface strength.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
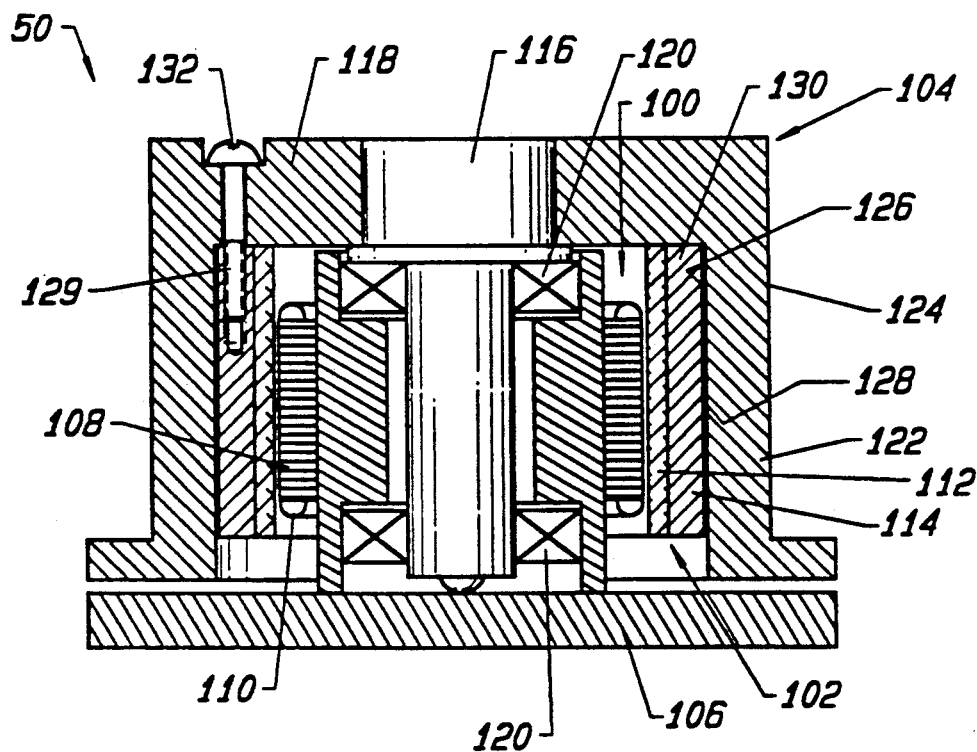
FIG. 1 is a sectional view of an outer rotor disc drive motor depicting the preferred embodiment of the present invention.

Referring to FIG. 1, there is shown a sectional view of an outer rotor type disc drive motor 50. The motor shown is of typical design for a rotary shaft motor. In general, the stator 100 magnetically propels the rotor 102 and spindle hub 104 rotationally about the stator 100. The one or more discs (not shown) mounted to the outer surface of the spindle hub 104 are rotated at a rate which facilitates data storage and retrieval in a timely and accurate manner.

The stator 100 is fixed to the disc drive frame 106. The stator 100 contains the active magnetic circuits including a laminated core 108 and a plurality of phase windings 110.

The rotor 102 consists of a plurality of permanent magnets 112 attached to the inner diameter of a back iron 114. The back iron 114 has a substantially cylindrical wall portion 114 to whose inner diameter the permanent magnets 112 are attached. In alternative motor designs, the back iron can be manufactured in a cup shape. However, in all designs the back iron will have a portion which is substantially cylindrical to which the permanent magnets 112 are attached.

The magnetic field generated by the stator 100 as the windings 110 are pulsed with current propels the rotor 102 in a circular manner peripherally about the stator 100. To transfer the rotating motion to the discs, the rotor is attached to a spindle hub 104.

The spindle hub 104 is cup shaped having a radially extending end wall portion 118 to which the shaft 116 is attached. In the exemplary motor of FIG. 1, the shaft is fitted into a hole in the end wall portion 118 of the spindle hub 104 and is oriented so that the shaft 116 extends axially internal to the cup shaped spindle hub 104. The shaft 116 cooperates with a pair of bearings 120 to facilitate smooth rotation of the spindle hub 104 about the stator 100.

The cup shaped spindle hub 104 has a storage disc receiving portion 122 which forms the wall of the cup shape. The storage disc receiving portion 122 has substantially cylindrical circumferential inner 124 and outer surfaces, where each surface 124 and 126 is coaxial with the shaft 116. The outer 126 surface 126 has a diameter slightly smaller than the inner diameter of a disc such that the storage disc receiving portion 122 extends coaxially through the central opening of a disc or discs (not shown).

The inner surface 126 has a diameter which is slightly larger than the diameter of the outer surface of the substantially cylindrical circumferential wall portion of the back iron 114. Thus, the spindle hub 104 easily fits over the rotor 102 maintaining a small air gap 128 between the inner surface 126 of the storage disc receiving portion 122 of the spindle hub 104 and the outer surface of the back iron 114 portion of the rotor 102.

The air gap 128 is maintained so that the thermal expansion and contraction of the back iron 114 does not distort the disc bearing spindle hub 104 causing disc misalignment or slippage.

Figure 2:
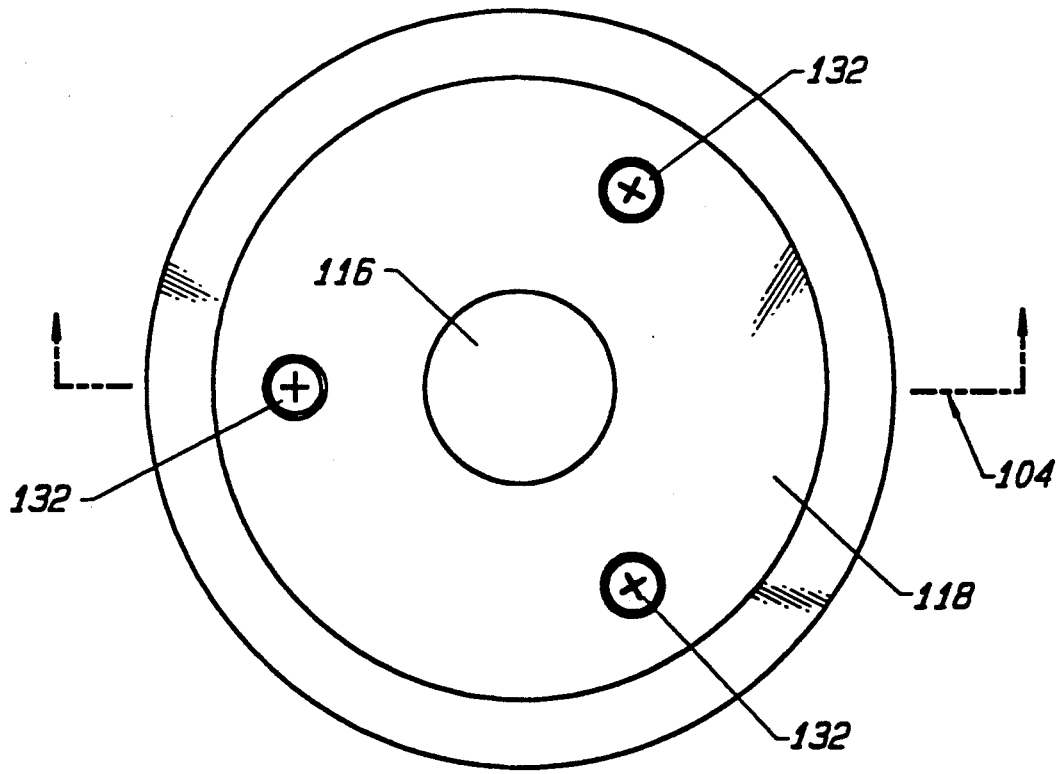
FIG. 2 is a top view of the motor in FIG. 1.

To attach the rotor 102 to the spindle hub 104, one end 130 of the substantially cylindrical circumferential wall portion of the back iron 114 is fixed to the radially extending end wall portion 118 of the spindle hub 104. The means for attaching the two portions 114 and 118 is preferably accomplished with a number of screws 132. As shown in FIG. 2, three screws separated by 120 degrees extend through the spindle hub 104 and are securely fastened into threads 129 in the back iron end 130.

Figures 3A, 3B:
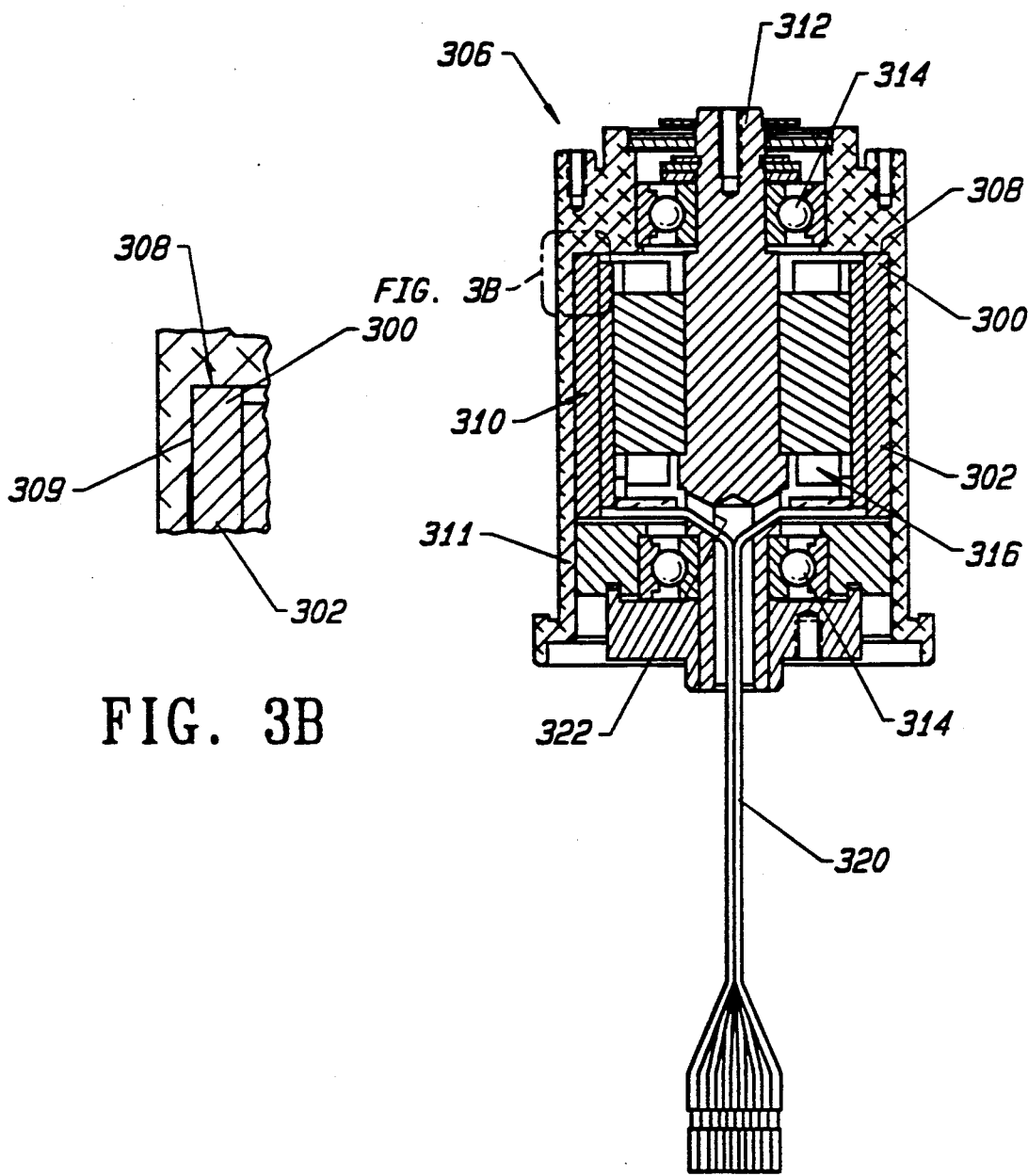
FIG. 3 is a sectional view of an outer rotor disc drive motor having a stationary shaft depicting an alternative embodiment of the present invention.

Alternatively, as depicted in the fixed shaft motor of FIG. 3, the means for attaching the end 300 of the back iron 302 to the spindle hub 306 is accomplished by applying epoxy to area 308. The epoxy used in the preferred embodiment is a two-part epoxy called Scotch Weld No. 1838, manufactured by 3M. However, any epoxy which bonds steel to aluminum will work. To facilitate greater stability at the rotor 310 and spindle hub 306 interface, a small area of contact 309 between the substantially cylindrical circumferential inner surface of the disc receiving portion 311 of the spindle hub 306 and outer surface of the substantially cylindrical wall portion of the back iron 302 is established. This small interface area 309 only slightly increases the chance that back iron 302 expansion will distort the spindle hub disc receiving portion 311 to a great enough degree to cause disc slippage.

Note that the stationary shaft motor has the same basic construction as the rotary shaft motor except the shaft 312 is not directly attached to the cup shaped spindle hub 306. Instead, a bearing system 314 is affixed between the stationary shaft 312 and the cup shaped spindle hub 306 such that the hub 306 is rotatable about the stator 316. Current pulses are supplied to the stator 316 via wires 320 routed through ports 322 in the stationary shaft 312. The pulsating current energizes the stator magnetics and causes the rotor to rotate about the stator 316 and shaft 312. Depicting the alternative embodiment effectuating the attachment of the rotor 310 to the spindle hub 306 in a stationary shaft motor exemplifies the fact that the invention is useful in a multitude of motor types.

In summary, the key inventive item is the substantial isolation of the outer surface of the back iron 114 from the inner surface of the spindle hub disc receiving portion 122 by an air gap 130. This ensures that the difference in thermal expansion coefficients of the two materials does not distort the outer surface of the disc receiving portion 122 of the spindle hub 104 as each material expands at a different rate. The adjoining surfaces of the back iron 114 and spindle hub 104 are limited to a small area in either alternative of attachment. Therefore, a limited amount of thermally induced distortion of the spindle hub 104 is evident.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A disc drive comprising:
   a disc drive frame;
   a shaft extending along an axis;
   a bearing system located around said shaft;
   a spindle hub having an end wall portion and a disc receiving portion, said end wall portion being attached to a rotatable surface and extending radially outward from said rotatable surface, said disc receiving portion extending down from said radially extending end wall portion and having an inner and an outer circumferential surface, said inner and outer circumferential surfaces extending along said axis, whereby said spindle hub rotates about said axis and said shaft extends internal to said spindle hub along said axis;
   at least one storage disc mounted on said downwardly extending disc receiving portion of said spindle hub;
   a back iron having a top and a bottom surface and an inner and an outer circumferential surface, said inner and outer circumferential surfaces extending along said axis, said top surface of said back iron being attached to said radially extending end wall portion of said spindle hub, whereby said outer circumferential surface of said back iron and said inner circumferential surface of said downwardly extending disc receiving portion having overlapping sections;
   a small air gap extending along said axis between substantially all of said overlapping sections of said outer circumferential surface of said back iron and said inner circumferential surface of said downwardly extending disc receiving portion, whereby said small air gap is maintained so that thermal expansion and contraction of said back iron does not distort said downwardly extending disc receiving portion and cause misalignment or slippage of said at least one storage disc;
   a rotor comprising a plurality of permanent magnets attached to said inner circumferential surface of said back iron;
   a stator comprising a laminate core and a plurality of phase windings, said stator being fixed to said disc drive frame, whereby said rotor rotates around said fixed stator; and means for attaching said top surface of said back iron to said radially extending end wall portion of said spindle hub.

2. A disc drive as claimed in claim 1 wherein said inner and outer circumferential surfaces of said downwardly extending disc receiving portion are substantially cylindrical and have diameters.

3. A disc drive as claimed in claim 1 wherein said inner and outer circumferential surfaces of said back iron are substantially cylindrical and have diameters.

4. A disc drive as claimed in claim 2 wherein said inner and outer circumferential surfaces of said back iron are substantially cylindrical and have diameters, said diameter of said substantially cylindrical outer circumferential surface of said back iron being slightly smaller than said diameter of said substantially cylindrical inner circumferential surface of said downwardly extending disc receiving portion for substantially all of said overlapping sections of said substantially cylindrical outer circumferential surface of said back iron and said substantially cylindrical inner circumferential surface of said downwardly extending disc receiving portion.

5. A disc drive comprising:
   a disc drive frame;
   a shaft extending along an axis;
   a bearing system located around said shaft;
   a spindle hub having an end wall portion and a disc receiving portion, said end wall portion being attached to a rotatable surface and extending radially outward from said rotatable surface, said disc receiving portion extending down from said radially extending end wall portion and having substantially cylindrical inner and outer circumferential surfaces, said substantially cylindrical inner and outer surfaces of said downwardly extending disc receiving portion having diameters and extending along said axis, whereby said spindle hub rotates about said axis and said shaft extends internal to said spindle hub along said axis;
   at least one storage disc mounted on said downwardly extending disc receiving portion of said spindle hub;
   a back iron having a top and a bottom surface and substantially cylindrical inner and outer circumferential surfaces, said substantially cylindrical inner and outer surfaces extending along said axis and having diameters, said back iron being attached to said radially extending end wall portion of said spindle hub, whereby said outer circumferential surface of said back iron and said inner circumferential surface of said downwardly extending disc receiving portion having overlapping sections;
   a small air gap extending along said axis between substantially all of said overlapping sections of said substantially cylindrical outer circumferential surface of said back iron and said substantially cylindrical inner circumferential surface of said downwardly extending disc receiving portion, whereby said diameter of said substantially cylindrical outer circumferential surface of said back iron is slightly smaller than said diameter of said substantially cylindrical inner circumferential surface of said downwardly extending disc receiving portion for substantially all of said overlapping sections of said substantially cylindrical outer surface of said back iron and said substantially cylindrical inner surface of said downwardly extending disc receiving portion, whereby said small air gap is maintained so that thermal expansion and contraction of said back iron does not distort said downwardly extending disc receiving portion of said spindle hub and cause misalignment or slippage of said at least one storage disc;
   a rotor comprising a plurality of permanent magnets attached to said inner circumferential surface of said back iron;
   a stator comprising a laminate core and a plurality of phase windings, said stator being fixed to said disc drive frame, whereby said rotor rotates around said fixed stator; and
   means for attaching said top surface of said back iron to said radially extending end wall portion of said spindle hub.

6. A disc drive as claimed in claim 5 wherein said spindle hub is cup shaped.

7. A disc drive as claimed in claim 5 wherein said shaft is rotatable and has an upper and a lower circumferential surface, and wherein said end wall portion is attached to said upper circumferential surface of said rotatable shaft.

8. A disc drive as claimed in claim 5 wherein said shaft is fixed and said bearing system has an upper and a lower assembly, said upper and lower assemblies having rotatable outer circumferential surfaces, and wherein said radially extending end wall portion is attached to said rotatable outer circumferential surface of said upper assembly.

9. A disc drive as claimed in claim 5 wherein said top and bottom surfaces of said back iron are annular shaped.

10. A disc drive as claimed in claim 5 wherein said back iron is made of steel and said spindle hub is made of aluminum.

11. A disc drive comprising:
    a disc drive frame;
    a rotatable shaft extending along an axis and having an upper and a lower circumferential surface;
    a bearing system located around said shaft;
    an aluminum cup shaped spindle hub having an end wall portion and a disc receiving portion, said end wall portion being attached to said upper circumferential surface of said rotatable shaft and extending radially outward from said rotatable shaft, said disc receiving portion extending down from said radially extending end wall portion and having substantially cylindrical inner and outer circumferential surfaces, said substantially cylindrical inner and outer surfaces having diameters and extending along said axis, whereby said aluminum cup shaped spindle hub rotates about said axis and said shaft extends internal to said aluminum cup shaped spindle hub along said axis;
    at least one storage disc mounted on said downwardly extending disc receiving portion of said spindle hub;
    a steel back iron having annular shaped top and bottom surfaces and substantially cylindrical inner and outer circumferential surfaces, said substantially cylindrical inner and outer surfaces extending along said axis and having diameters, said annular shaped top surface of said back iron being attached to said radially extending end wall portion of said spindle hub, whereby said outer circumferential surface of said back iron and said inner circumferential surface of said downwardly extending disc receiving portion having overlapping sections;

a small air gap extending along said axis between substantially all of said overlapping sections of said substantially cylindrical outer circumferential surface of said back iron and said overlapping portion of said substantially cylindrical inner circumferential surface of said downwardly extending disc receiving portion, wherein said diameter of said substantially cylindrical outer circumferential surface of said back iron is slightly smaller than said diameter of said substantially cylindrical inner circumferential surface of said downwardly extending disc receiving portion for substantially all of said overlapping sections of said substantially cylindrical outer surface of said back iron and said substantially cylindrical inner surface of said downwardly extending disc receiving portion, wherein said small air gap is maintained so that thermal expansion and contraction of said back iron does not distort said downwardly extending disc receiving portion of said spindle hub and cause misalignment or slippage of said at least one storage disc;

a rotor comprising a plurality of permanent magnets attached to said inner circumferential surface of said steel back iron;

a stator comprising a laminate core and a plurality of phase windings, said stator being fixed to said disc drive frame, whereby said rotor rotates around said fixed stator; and means for attaching said annular shaped top surface of said steel back iron to said radially extending end wall portion of said aluminum cup shaped spindle hub.

12. A disc drive as claimed in claim 11 wherein said means for attaching said annular shaped top surface of said steel back iron to said radially extending end wall portion of said aluminum cup shaped spindle hub comprises epoxy applied between said radially extending end wall portion and said annular shaped top surface of said steel back iron and between a small upper portion of said substantially cylindrical outer circumferential surface of said steel back iron and a small upper portion of said inner circumferential surface of said downwardly extending disc receiving portion.

13. A disc drive as claimed in claim 11 wherein said means for attaching said annular shaped top surface of said back iron to said radially extending end wall portion of said aluminum cup shaped spindle hub comprises at least one screw extending through said radially extending end wall portion and into a threaded part in said annular shaped top surface of said back iron.

14. A disc drive as claimed in claim 11 wherein said means for attaching said annular shaped top surface of said back iron to said radially extending end wall portion of said aluminum cup shaped spindle hub comprises three screws separated by 120 degrees, said screws extending through said radially extending end wall portion and into a threaded part in said annular shaped top surface of said back iron.

15. A disc drive as claimed in claim 11 wherein said means for attaching said annular shaped top surface of said back iron to said radially extending end wall portion of said aluminum cup shaped spindle hub comprises epoxy applied between said radially extending end wall portion and said annular shaped top surface of said back iron.

16. A disc drive comprising:

a disc drive frame;

a shaft fixed to said disc drive frame and extending along an axis;

a bearing system located around said shaft and having an upper end and a lower assembly, said upper and lower assemblies having a rotatable outer circumferential surface;

an aluminum cupped shaped spindle hub having an end wall portion and a disc receiving portion, said end wall portion being attached to said rotatable upper circumferential surface of said upper assembly of said bearing system and extending radially outward from said upper assembly, said disc receiving portion extending down from said radially extending end wall portion and having substantially cylindrical inner and outer circumferential surfaces, said substantially cylindrical inner and outer surfaces having diameters and extending along said axis, whereby said aluminum cup shaped spindle hub rotates about said axis and said shaft extends internal to said aluminum cup shaped spindle hub along said axis;

at least one storage disc mounted on said downwardly extending disc receiving portion of said spindle hub;

a steel back iron having annular shaped top and bottom surfaces and substantially cylindrical inner and outer circumferential surfaces, said substantially cylindrical inner and outer surfaces extending along said axis and having diameters, said annular shaped top surface of said back iron being attached to said radially extending end wall portion of said spindle hub, whereby said outer circumferential surface of said back iron and said inner circumferential surface of said downwardly extending disc receiving portion having overlapping sections;

a small air gap extending along said axis between substantially all of said overlapping sections of said substantially cylindrical outer circumferential surface of said back iron and said substantially cylindrical inner circumferential surface of said downwardly extending disc receiving portion, wherein said diameter of said substantially cylindrical outer circumferential surface of said back iron is slightly smaller than said diameter of said substantially cylindrical inner circumferential surface of said downwardly extending disc receiving portion for substantially all of said overlapping sections of said substantially cylindrical outer surface of said back iron and said substantially cylindrical inner surface of said downwardly extending disc receiving portion, whereby said small air gap is maintained so that thermal expansion and contraction of said back iron does not distort said downwardly extending disc receiving portion of said spindle hub and cause misalignment or slippage of said at least one storage disc;

a rotor comprising a plurality of permanent magnets attached to said inner circumferential surface of said steel back iron;

a stator comprising a laminate core and a plurality of phase windings, said stator being fixed to said disc drive frame, whereby said rotor rotates around said fixed stator; and means for attaching said annular shaped top surface of said steel back iron to said radially extending end wall portion of said aluminum cup shaped spindle hub.

17. A disc drive as claimed in claim 16 wherein said means for attaching said annular shaped top surface of said steel back iron to said radially extending end wall portion of said aluminum cup shaped spindle hub comprises epoxy applied between said radially extending end wall portion and said annular shaped top surface of said steel back iron and between a substantially small upper portion of said substantially cylindrical outer circumferential surface of said steel back iron and a substantially small upper portion of said inner circumferential surface of said downwardly extending disc receiving portion.

18. A disc drive as claimed in claim 16 wherein said means for attaching said annular shaped top surface of said back iron to said radially extending end wall portion of said aluminum cup shaped spindle hub comprises at least one screw extending through said radially extending end wall portion and into a threaded part in said annular shaped top surface of said back iron.

19. A disc drive as claimed in claim 16 wherein said means for attaching said annular shaped top surface of said back iron to said radially extending end wall portion of said aluminum cup shaped spindle hub comprises three screws separated by 120 degrees, said screws extending through said radially extending end wall portion and into a threaded part in said annular top surface of said back iron.

20. A disc drive as claimed in claim 16 wherein said means for attaching said annular shaped top surface of said back iron to said radially extending end wall portion of said aluminum cup shaped spindle hub comprises epoxy applied between said radially extending end wall portion and said annular shaped top surface of said back iron.

* * * * *